(12) United States Patent
Uemura et al.

(10) Patent No.: US 8,218,199 B2
(45) Date of Patent: Jul. 10, 2012

(54) IMAGE FORMING APPARATUS CAPABLE OF IMPROVING AN IMAGE QUALITY OF A BARCODE WHILE SUPPRESSING DETERIORATION IN A QUALITY OF AN IMAGE

(75) Inventors: Satoshi Uemura, Osaka (JP); Issei Nakano, Osaka (JP)

(73) Assignee: Kyocera Mita Corporation (JP)

( * ) Notice: Subject to any disclaimer, the term of this patent is extended or adjusted under 35 U.S.C. 154(b) by 741 days.

(21) Appl. No.: 12/354,441

(22) Filed: Jan. 15, 2009

(65) Prior Publication Data

US 2009/0185206 A1 Jul. 23, 2009

(30) Foreign Application Priority Data

Jan. 17, 2008 (JP) ................................. 2008-007994
Dec. 12, 2008 (JP) ................................. 2008-316556

(51) Int. Cl.
*G06K 1/00* (2006.01)

(52) U.S. Cl. ......... 358/1.9; 399/154; 399/176; 399/253; 399/310; 399/409; 347/139

(58) Field of Classification Search .................. 358/471, 358/488, 1.15, 1.13, 1.9; 399/154, 176, 253, 399/310, 313, 387, 409; 347/139
See application file for complete search history.

(56) References Cited

U.S. PATENT DOCUMENTS

| | | | | |
|---|---|---|---|---|
| 5,191,408 A | * | 3/1993 | Takanashi et al. | 358/471 |
| 5,436,691 A | * | 7/1995 | Rees et al. | 399/219 |
| 5,486,900 A | * | 1/1996 | Wada et al. | 399/196 |
| 6,283,647 B1 | * | 9/2001 | Konishi et al. | 400/103 |
| 6,712,268 B1 | * | 3/2004 | Mason et al. | 235/383 |
| 2002/0005888 A1 | * | 1/2002 | Obata et al. | 347/139 |
| 2008/0018949 A1 | * | 1/2008 | Fukuda | 358/450 |
| 2008/0084580 A1 | * | 4/2008 | Tamura et al. | 358/1.15 |
| 2008/0123162 A1 | * | 5/2008 | Sugiura | 358/488 |

FOREIGN PATENT DOCUMENTS

JP 3370711 11/2002

\* cited by examiner

*Primary Examiner* — Benny Q Tieu
*Assistant Examiner* — Juan Guillermety
(74) *Attorney, Agent, or Firm* — Gerald E. Hespos; Michael J. Porco

(57) ABSTRACT

An image forming apparatus includes an image formation portion forming an image onto a recording medium in an electro-photographic process. An acquisition portion acquires image data and a storage portion stores in advance first and second image formation conditions for the electro-photographic process. A condition setting portion sets the first image-formation condition for an image formation operation, if data indicating a bar code is not included in image data acquired by the acquisition portion, and sets the second image formation condition for an image formation operation if image data indicating a bar code is included in image data acquired by the acquisition portion. A control portion allows the image formation portion to execute an image formation operation based on image data acquired by the acquisition portion according to the image formation condition set by the condition setting portion.

19 Claims, 7 Drawing Sheets

| CONDITION | DEVELOPMENT FREQUENCY | DRUM-SURFACE POTENTIAL |
|---|---|---|
| 1 | $\alpha \pm 0$(kHz) | $\beta \pm 0$(V) |
| 2 | $\alpha - 3$(kHz) | $\beta + 10$(V) |
| 3 | $\alpha - 6$(kHz) | $\beta + 20$(V) |

FIG.6
SET DISCHARGED PAPER AGAIN AND
PRESS START BUTTON.
FIG.7A
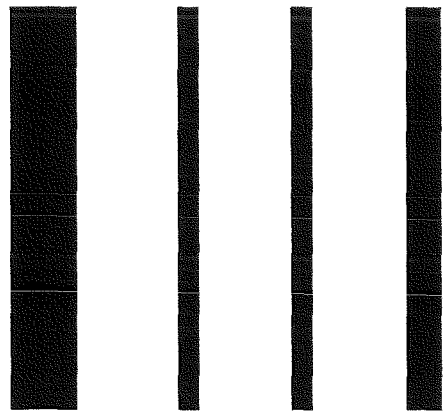
FIG.7B
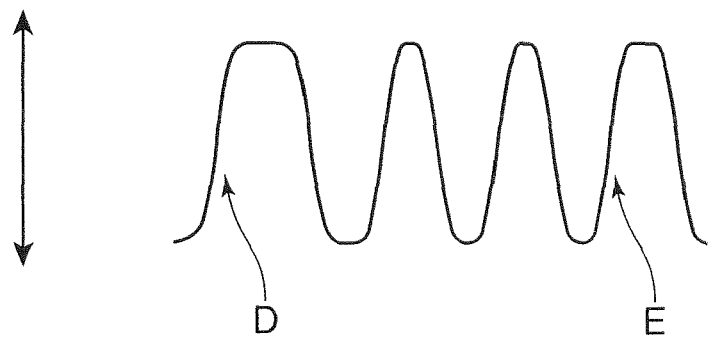

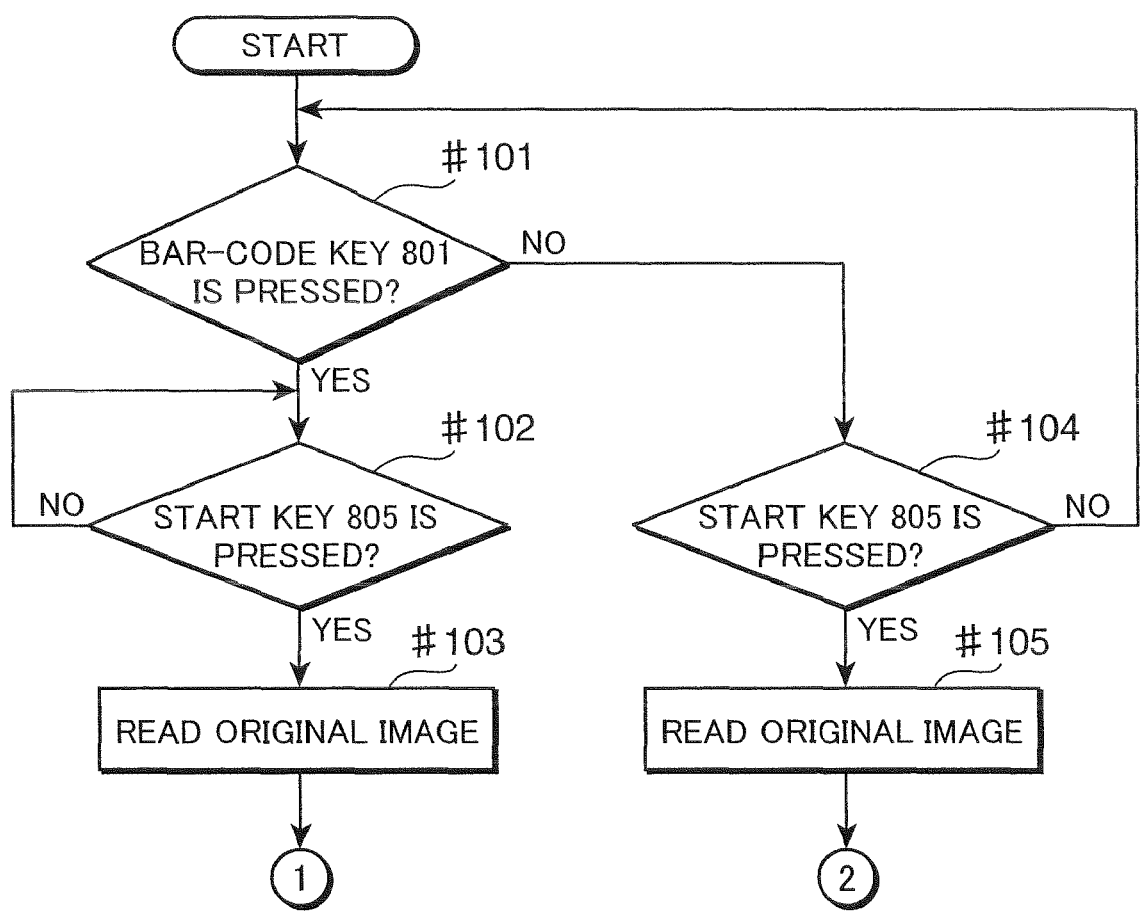

IMAGE FORMING APPARATUS CAPABLE OF
IMPROVING AN IMAGE QUALITY OF A
BARCODE WHILE SUPPRESSING
DETERIORATION IN A QUALITY OF AN
IMAGE

BACKGROUND OF THE INVENTION

1. Field of the Invention

The present invention belongs to the technological field of an image forming apparatus and particularly relates to the art of recording a bar code in a recording medium.

2. Description of the Related Art

In recent years, printing a bar code in an image forming apparatus such as a printer has become increasingly popular and an even finer bar has come into general use, thereby requiring an improvement in printing precision for a bar code. In order to print a bar code more precisely, for example, Japanese Patent No. 3370711 disclosed an art of forming a bar code with a black bold line, a black fine line, a white bold line and a white fine line, and in consideration of the fact that an ink runs, printing each line (bar) of the bar code which is finer than a width necessary for each line of an ordinary bar code and determining the number of dots forming each line in such a way that the line width becomes optimum after an ink runs.

In short, the art disclosed in Japanese Patent No. 3370711 is designed to print the black bold line, black fine line, white bold line and white fine line having appropriate widths, merely by paying attention to the thickness of each bar.

However, there are a number of parameters determining printing precision for a bar code: a bar thickness, as well as a bar density, whether a white line is accurately white, whether a bar is partly omitted, and the like. In Japanese Patent No. 3370711, these parameters other than the bar thickness are not taken into account, thereby leaving room for printing a bar code more precisely.

In addition, if a general-purpose image forming apparatus which prints various objects including a bar code executes an image processing for fining a line to thereby upgrade the image of a bar code, the quality of an ordinary image except the bar code may be deteriorated.

SUMMARY OF THE INVENTION

It is an object of the present invention to provide an image forming apparatus capable of improving the image quality of a bar code while suppressing a deterioration in the quality of an ordinary image other than the bar code.

An image forming apparatus according to an aspect of the present invention includes: an image formation portion forming an image onto a recording surface of a recording medium forwarded in a predetermined forwarding direction in an electro-photographic process of transferring a toner image obtained by developing an electrostatic latent image indicating an image with toner to thereby form an image; an image-data acquisition portion acquiring image data; an image-formation condition storage portion storing in advance first and second image formation conditions which are conditions for the electro-photographic process and different from each other; an image-formation condition setting portion which executes an image-formation condition setting processing for, if data indicating a bar code is not included in image data acquired by the image-data acquisition portion, then setting the first image formation condition as an image formation condition for an image formation operation based on the image data, and if image data indicating a bar code is included in image data acquired by the image-data acquisition portion, then setting the second image formation condition as an image formation condition for an image formation operation based on the image data; and an image-formation control portion allows the image formation portion to execute an image formation operation based on image data acquired by the image-data acquisition portion according to the image formation condition set by the image-formation condition setting portion.

According to this configuration, if data indicating a bar code is not included in image data acquired by the image-data acquisition portion, in other words, if an ordinary image including no bar code is formed, then the image-formation control portion sets the first image formation condition for the electro-photographic process suitable for forming the ordinary image as an image formation condition for an image formation operation based on the image data. Therefore, the image formation portion can form an image based on the image data acquired by the image-data acquisition portion in accordance with the image formation condition suitable for forming the ordinary image, thereby suppressing a deterioration in the quality of the ordinary image except the bar code.

On the other hand, if data indicating a bar code is included in image data acquired by the image-data acquisition portion, in other words, if an image of the bar code is formed, then the image-formation control portion sets the second image formation condition for the electro-photographic process suitable for forming the image of the bar code different from the first image formation condition as an image formation condition for an image formation operation based on the image data. Therefore, the image formation portion can form an image based on the image data acquired by the image-data acquisition portion in accordance with the image formation condition suitable for forming the image of the bar code, thereby improving the image quality of the bar code. In this case, the condition for the electro-photographic process becomes suitable for forming the bar-code image, thereby enhancing the bar-code image quality in other factors than the bar thickness as well. This makes it possible to improve the bar-code image quality while suppressing a deterioration in the quality of an ordinary image other than the bar code.

These and other objects, features and advantages of the present invention will become more apparent upon reading of the following detailed description along with the accompanied drawings.

BRIEF DESCRIPTION OF THE DRAWINGS

FIG. 6 shows a guidance picture leading a user into allowing an original reading portion to read an image on a sheet of paper.

FIGS. 7A and 7B are an enlarged view of some bars in a bar code and a graphical representation showing image data, respectively, explaining how to evaluate the quality of a read image of a bar code.

FIG. 8 is a flow chart showing an operation of the image forming apparatus of FIG. 1.

DETAILED DESCRIPTION OF THE PREFERRED EMBODIMENTS

Figure 1:
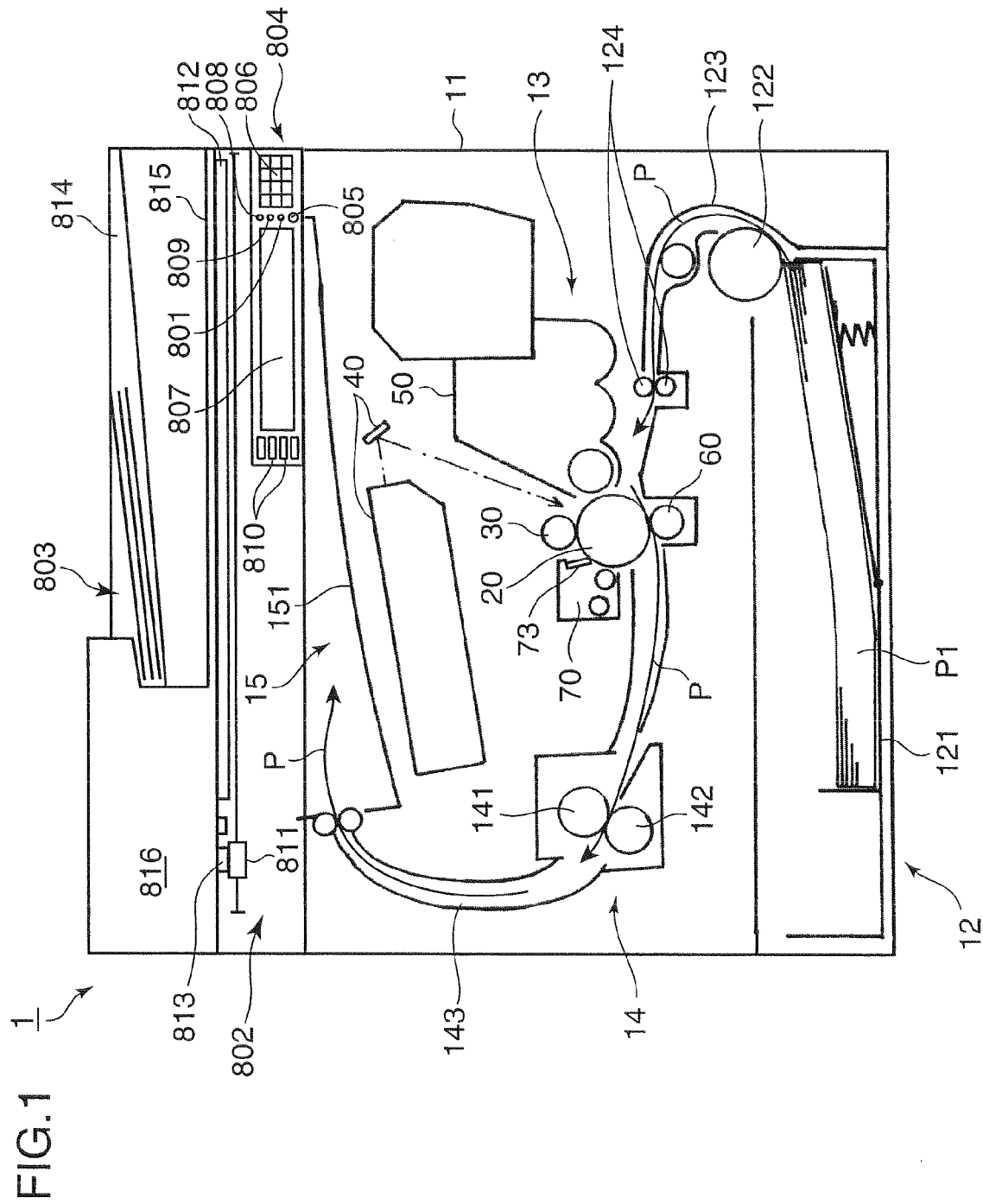
FIG. 1 is a front sectional view of an image forming apparatus according to an embodiment of the present invention.

An image forming apparatus according to each embodiment of the present invention will be below described. In each figure, component elements are given the same reference numerals and characters as long as they are identical, and their description is omitted. FIG. 1 shows a configuration of an image forming apparatus according to a first embodiment of the present invention.

As shown in FIG. 1, an image forming apparatus 1 includes an original reading portion 802 provided in an upper part of the apparatus 1 and an original-paper feed portion 803 provided above the original reading portion 802.

The original reading portion 802 includes a scanner portion 811 formed by a CCD (charge coupled device) sensor, an exposure lamp and the like, an original-paper table 812 made of a transparent member such as glass, and an original reading slit 813.

The scanner portion 811 can be moved in the right-and-left directions of FIG. 1 along the surface of original paper by a drive portion (not shown). The CCD sensor is arranged in such a way that the pixel rows are in array in directions perpendicular to the movement directions of the scanner portion 811 (directions perpendicular to the paper surface of FIG. 1).

Figure 3:
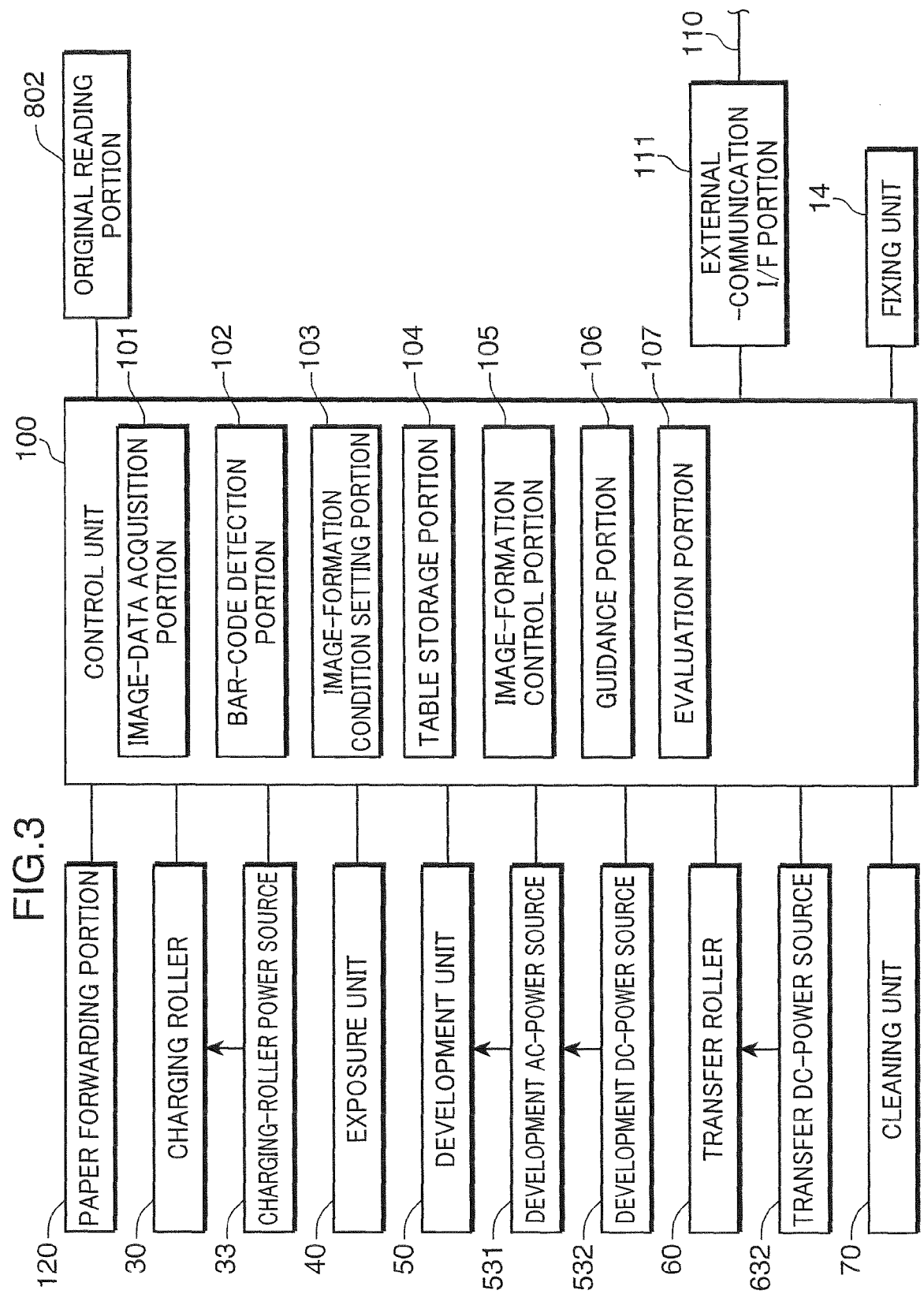
FIG. 3 is a block diagram showing an electrical configuration of a printer shown in FIG. 1.

When executing reading for a sheet of original paper placed on the original-paper table 812, the scanner portion 811 moves in the right-and-left directions of FIG. 1 along the original-paper surface in a position facing the original-paper table 812, acquires image data while scanning an original image and outputs it to a control unit 100 (FIG. 3). On the other hand, when executing reading for a sheet of original paper sent by the original-paper feed portion 803, the scanner portion 811 moves to a position facing the original reading slit 813, acquires an original image through the original reading slit 813 while synchronizing with an original-paper forwarding operation by the original-paper feed portion 803 and outputs image data thereon to the control unit 100.

The original-paper feed portion 803 includes an original-paper placement portion 814 for placing original paper, an original-paper discharge portion 815 for discharging original paper after an image thereof is read, and an original-paper forwarding mechanism 816 formed by a paper feed roller, a forwarding roller (not shown) and the like for delivering one by one sheets of original paper placed on the original-paper placement portion 814, forwarding them to a position facing the original reading slit 813 and discharging them to the original-paper discharge portion 815. The original-paper forwarding mechanism 816 is further provided with a paper reversal mechanism (not shown) reversing a sheet of original paper and forwarding it again to the position facing the original reading slit 813, thereby enabling the scanner portion 811 to read images on both surfaces of the original paper through the original reading slit 813.

The original-paper feed portion 803 is mounted on the main body of the apparatus in such a way that the front part thereof can move up and turn freely with respect to the main body. The front part of the original-paper feed portion 803 moves above to open the upper surface of the original-paper table 812, thereby enabling an operator to place a sheet of original paper to be read, for example, a book spread out or the like on the upper surface of the original-paper table 812.

The image forming apparatus 1 is provided at a front part thereof with an operation portion 804. The operation portion 804 includes: a bar-code key 801 (instruction acceptance portion) for giving an instruction to set a bar code; a start key 805 for a user inputting a print executive instruction; a ten key 806 for inputting the number of prints or the like; a display portion 807 which displays operation guidance information on various copying operations or the like and is formed by a liquid crystal display and the like having a touch-panel function of setting and inputting various such operations; a reset key 808 for resetting setting contents set in the display portion 807; a stop key 809 for stopping a printing (image-forming) operation in execution; and a function switching key 810 for switching various functions provided in the image forming apparatus 1.

The image forming apparatus 1 includes: a paper storage portion 12 stores a sheet of paper P (recording medium) subjected to a printing processing; an image formation portion 13 giving an image transfer processing to each sheet of paper P delivered out of a paper sheaf P1 stored in the paper storage portion 12; a fixing unit 14 giving a fixing processing to the paper P subjected to the printing processing in the image formation portion 13; and a paper discharge portion 15 discharging the paper P subjected to the fixing processing in the fixing unit 14.

The paper storage portion 12 is provided with a predetermined number of (one in this embodiment) paper cassette 121 freely inserted into and extracted from an apparatus body 11. At the upstream end (in the right direction of FIG. 1) of the paper cassette 121, a pickup roller 122 is provided which delivers the sheet of paper P one at a time out of the paper sheaf P1. The sheet of paper P delivered from the paper cassette 121 by the drive of the pickup roller 122 is fed to the image formation portion 13 through a fed-paper forwarding path 123 and a resist roller pair 124 at the downstream end of the fed-paper forwarding path 123.

The image formation portion 13 transfers a toner image onto the sheet of paper P on the basis of image information transmitted to an external-communication I/F portion 111 from a computer or the like through a transmission line 110 (described later). It is formed by: a photosensitive drum 20 rotating on a drum shaft extending in the front-and-rear directions (directions perpendicular to the paper surface of FIG. 1); and clockwise from right above the photosensitive drum 20 along the peripheral surface thereof, a charging roller 30 (charging portion); an exposure unit 40; a development unit 50 (development portion); a transfer roller 60 (transfer portion); and a cleaning unit 70.

The photosensitive drum 20 forms an electrostatic latent image on the peripheral surface and thereafter forms a toner image along the electrostatic latent image. It has an amorphous silicon layer laminated on the peripheral surface which is suitable for forming those images. The photosensitive drum 20 is concentrically united and supported to the drum shaft extending in the front-and-rear directions (directions perpendicular to the paper surface of FIG. 1) substantially in the middle of the apparatus body 11 and rotates together with the drum shaft while the drum shaft is rotating clockwise by the drive of a drive means (not shown).

The charging roller 30 allows the photosensitive drum 20 rotating clockwise around the drum core to carry a uniform electric charge on the peripheral surface. It rotates while following the photosensitive drum 20 in contact with the peripheral surface of the photosensitive drum 20 to thereby give the electric charge to the photosensitive drum 20. Instead of the charging roller 30, a corona discharge system may be employed which gives an electric charge to the peripheral surface of the photosensitive drum 20 using corona discharge from a wire.

The exposure unit 40 irradiates the peripheral surface of the rotating photosensitive drum 20 with a laser beam given an intensity based on image data telegraphed from an external apparatus such as a computer and erases an electric charge in a part irradiated with the laser beam to thereby form an electrostatic latent image on the peripheral surface.

The development unit 50 supplies a toner as a developer to the peripheral surface of the photosensitive drum 20 in such a way that the toner adheres to the part of an electrostatic latent image formed on the peripheral surface to thereby form a toner image on the peripheral surface of the photosensitive drum 20. In this embodiment, a so-called mono-component type containing only toner is employed as the developer. The developer of the image forming apparatus according to the present invention is not limited to a mono-component developer containing only toner. Alternatively, it may be appreciated that the developer is a so-called dual-component type containing toner and carrier.

The transfer roller 60 transfers a positively-charged toner image formed on the peripheral surface of the photosensitive drum 20 onto the sheet of paper P sent right under the photosensitive drum 20. It is designed to give the sheet of paper P a negative electric charge corresponding to a polarity reverse to the electric charge of a toner image.

Therefore, the sheet of paper P which has passed right under the photosensitive drum 20 is pressed and held between the transfer roller 60 and the photosensitive drum 20 and the positively-charged toner image on the peripheral surface of the photosensitive drum 20 is pulled and peeled off toward the surface of the negatively-charged sheet of paper P to thereby give the transfer processing to the sheet of paper P.

The cleaning unit 70 cleans the toner remaining on the peripheral surface of the photosensitive drum 20 after the transfer processing to thereby bring the cleaned peripheral surface of the photosensitive drum 20 again to the charging roller 30 for the next image forming processing.

The fixing unit 14 heats and fixes the toner image of the sheet of paper P subjected to the transfer processing in the image formation portion 13. It includes a heating roller 141 having an electrical heating body such as a halogen lamp embedded therein and a pressure roller 142 arranged under the heating roller 141 in such a way that both peripheral surfaces face each other. The sheet of paper P after the transfer processing passes a nip portion between the heating roller 141 rotating clockwise around the roller core and the pressure roller 142 rotated counterclockwise around the roller core by the heating roller 141 to thereby undergo the fixing processing by the heat of the heating roller 141. The sheet of paper P subjected to the fixing processing is discharged through a discharged-paper forwarding path 143 to the paper discharge portion 15.

The paper discharge portion 15 is a concave portion formed in the top part of the apparatus body 11 and provided at the bottom with a discharged-paper tray 151 receiving the discharged sheet of paper P.

Figure 2:
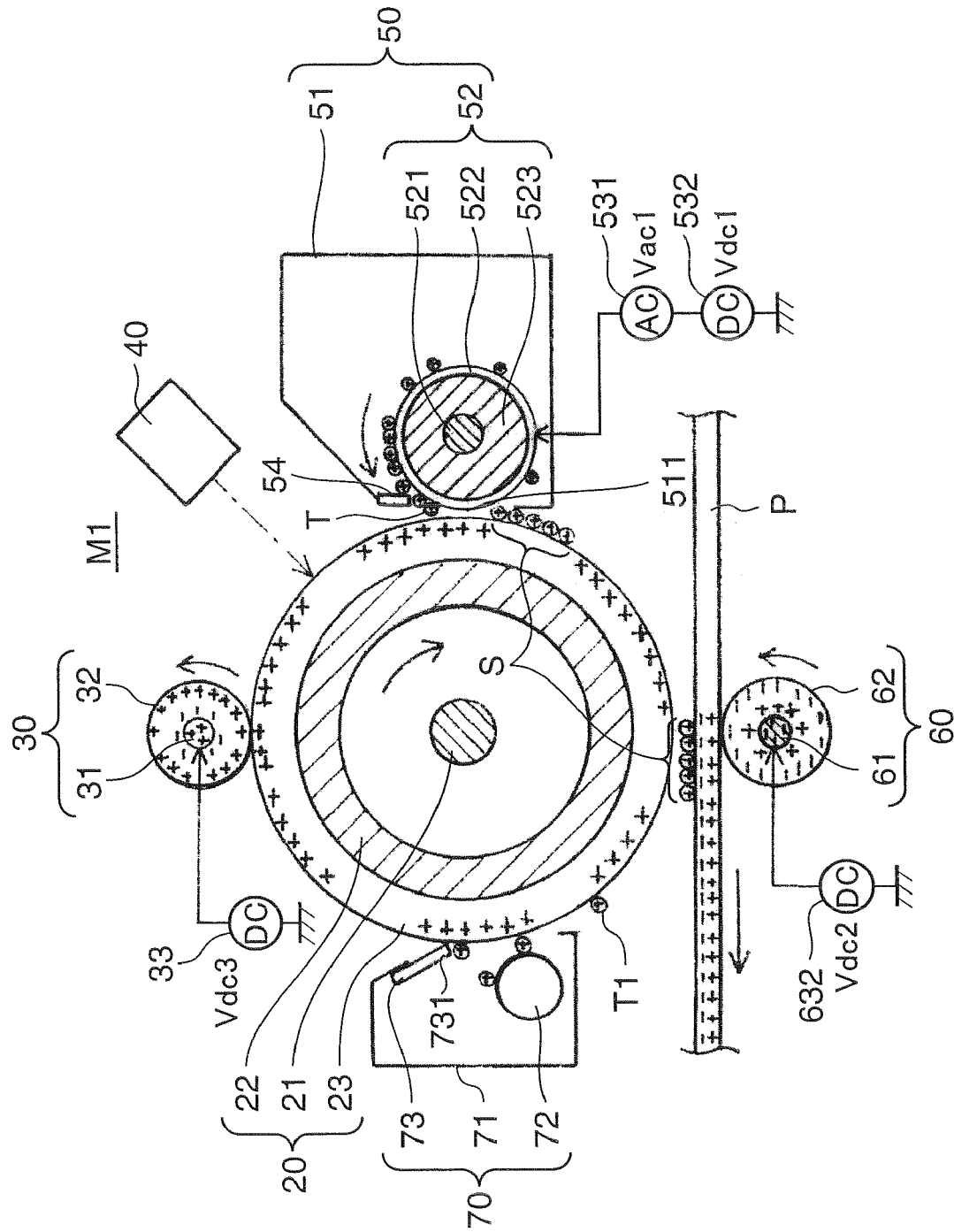
FIG. 2 is a front view showing in detail a configuration of an image formation portion shown in FIG. 1.

FIG. 2 shows in detail a configuration of the image formation portion 13 of FIG. 1 by exaggerating the component elements of the photosensitive drum 20 and the thickness of the sheet of paper P. As shown in FIG. 2, the photosensitive drum 20 includes, for example, a drum shaft 21, an aluminum elementary tube 22 which is made of an aluminum alloy and rotates concentrically around the drum shaft 21, and an amorphous silicon layer 23 uniformly laminated on the peripheral surface of the aluminum elementary tube 22 in vapor deposition or the like. The photosensitive drum 20 rotates clockwise by the drive of a drum motor (not shown).

The amorphous silicon layer 23 is formed by hardening silicon (Si) or a silicon compound (such as SiC, SiO and SiON) in a solid-solution state ordinarily by physical vapor deposition such as sputtering. The amorphous silicon layer 23 (particularly made of SiC) has an excellent charging capability because of its great resistance and is superior in wear resistance and environmental resistance, and thus, it is suitable as a material for forming an electrostatic latent image or a toner image.

The charging roller 30 is provided with a charging-roller power source 33 connected thereto which applies, to the charging roller 30, a direct-current charging voltage $Vdc3$ whose voltage value is set in accordance with a control signal from a control unit 100.

The charging roller 30 applies the charging voltage $Vdc3$ from the charging-roller power source 33 to the amorphous silicon layer 23 while its peripheral surface keeps in contact with the peripheral surface (i.e., the amorphous silicon layer 23) of the photosensitive drum 20. It includes a charging-roller shaft 31 made of metal and a charging-roller body 32 made of a dielectric material such as elastomer which is united concentrically with the charging-roller shaft 31.

The charging-roller power source 33 applies a positive voltage to the charging-roller shaft 31 to thereby produce a positive electric charge on the peripheral surface of the charging-roller body 32. In this state, the charging roller 30 is driven and rotated counterclockwise around the axial center by the photosensitive drum 20 rotating clockwise around the drum shaft 21 and charges the surface potential of the photosensitive drum 20, for example, to 400 volts to thereby produce a uniform positive electric charge on the amorphous silicon layer 23.

The exposure unit 40 irradiates the uniform electric-charge surface on the amorphous silicon layer 23 formed by the charging roller 30 with a laser beam given an intensity based on telegraphed image data, thereby forming an electrostatic latent image whose positive electric charge has all or almost disappeared on the peripheral surface (the amorphous silicon layer 23) of the photosensitive drum 20 rotating around the drum shaft 21. In FIG. 2, a mark "+" indicating a positive electric charge is erased on the peripheral surface of the photosensitive drum 20 irradiated by the exposure unit 40.

The development unit 50 supplies a toner T to the amorphous silicon layer 23 of the photosensitive drum 20 formed by the exposure unit 40 to thereby form a toner image S along an electrostatic latent image. It includes a box-like development-unit body 51 charged with toner, and a development roller 52 placed inside of the development-unit body 51 with exposing a part of its peripheral surface. The development unit 50 supplies the toner T (shown by giving the mark "+" within a circle in FIG. 2) inside of the development-unit body 51 from the peripheral surface of the development roller 52 rotating around the axial center parallel to the drum shaft 21 of the photosensitive drum 20 to the amorphous silicon layer 23 rotating around the drum shaft 21, thereby forming the toner image S on the surface of the amorphous silicon layer 23.

The development-unit body 51 is formed at a wall-surface part thereof facing the peripheral surface of the photosensitive drum 20 with a toner supply opening 511 for delivering the toner T inside of the development-unit body 51 to the peripheral surface of the photosensitive drum 20. As the development roller 52 rotates, the toner T inside of the development-unit body 51 is supplied through the toner supply opening 511 to the peripheral surface of the photosensitive drum 20.

The development roller 52 includes: a non-rotational development-roller shaft 521 parallel to the drum shaft 21; a fixed magnet 523 united concentrically with the development-roller shaft 521; and a development sleeve 522 fitted on the fixed magnet 523 and rotating around the development-roller shaft 521. The development sleeve 522 is made of a metal such as SUS and aluminum, a conductive resin or the like.

The development roller 52 is provided with a development AC-power source 531 and a development DC-power source 532 connected in series thereto. The development AC-power source 531 and the development DC-power source 532 output an alternating voltage Vac1 and a direct-current voltage Vdc1, respectively, whose voltage values are each set in accordance with a control signal from the control unit 100. A development voltage V1 containing the direct-current voltage Vdc1 outputted from the development DC-power source 532 and the alternating voltage Vac1 outputted from the development AC-power source 531 is applied to the development roller 52. For example, the alternating voltage Vac1 is set to AC 1.5 kV and 3.5 kHz, and the direct-current voltage Vdc1 is set to DC 300 volts.

The development voltage V1 containing the direct-current voltage Vdc1 and the alternating voltage Vac1 is applied to the development roller 52 to thereby positively charge the peripheral surface of the development sleeve 522. Then, a development roller motor (not shown) is driven to rotate the development sleeve 522 counterclockwise round the development-roller shaft 521, thereby positively charging the toner T inside of the development-unit body 51 and supplying it to the amorphous silicon layer 23 of the photosensitive drum 20.

The development-unit body 51 is provided at the upper edge of the toner supply opening 511 with a toner-layer regulation blade 54 for keeping at a predetermined uniform value the thickness of the toner T which is supplied to the photosensitive drum 20 from the peripheral surface of the development sleeve 522 as it rotates. The toner T passes under the toner-layer regulation blade 54, thereby preventing its oversupply to the photosensitive drum 20. In this embodiment, the distance (gap) between the toner-layer regulation blade 54 and the development sleeve 522 is set to 100 μm.

The transfer roller 60 gives a polarity (negative polarity in this embodiment) reverse to the electric-charge polarity of the toner image S formed on the peripheral surface of the photosensitive drum 20 to thereby peel the toner image S from the amorphous silicon layer 23 and transfers the peeled toner image S onto the sheet of paper P passing between the peripheral surface of the transfer roller 60 and the amorphous silicon layer 23.

The transfer roller 60 is provided with a transfer DC-power source 632 connected thereto which outputs a direct-current voltage Vdc2 whose voltage value is set in accordance with a control signal from the control unit 100. A transfer voltage V2 equivalent to the direct-current voltage Vdc2 outputted from the transfer DC-power source 632 is applied to the transfer roller 60. For example, the direct-current voltage Vdc2 is set to DC −3 kilovolts and the transfer voltage V2 is set to a negative polarity.

The transfer roller 60 includes a transfer-roller shaft 61 parallel to the drum shaft 21 of the photosensitive drum 20 and a transfer-roller body 62 united concentrically so as to rotate with the transfer-roller shaft 61 and is given the negative transfer voltage V2 from the transfer DC-power source 632. Therefore, the sheet of paper P passes in close contact with the peripheral surface of the transfer-roller body 62 between the transfer-roller body 62 and the amorphous silicon layer 23 of the photosensitive drum 20, thereby causing the toner image S formed with the positively-charged toner T to undergo electrostatic absorption toward the surface of the negatively-charged sheet of paper P, so that the toner image S formed on the peripheral surface of the photosensitive drum 20 can be transferred onto the sheet of paper P.

The cleaning unit 70 cleans a residual toner T1 remaining on the amorphous silicon layer 23 after the toner image S on the surface of the amorphous silicon layer 23 of the photosensitive drum 20 is transferred onto the sheet of paper P. It includes a box-like cleaning-unit body 71, a cleaning roller 72 placed below inside of the cleaning-unit body 71 in such a way that its peripheral surface comes in contact with the peripheral surface (the amorphous silicon layer 23) of the photosensitive drum 20, and a cleaning blade 73 placed above inside of the cleaning-unit body 71 in such a way that its tip comes in contact with the peripheral surface of the photosensitive drum 20.

The cleaning roller 72 is united concentrically with a roller shaft parallel to the drum shaft 21 and is made of a tenacious synthetic resin which can be elastically deformed.

The cleaning roller 72 rotates around the roller shaft at a peripheral speed higher than the photosensitive drum 20 in the opposite direction (counterclockwise in FIG. 2) to the photosensitive drum 20 to thereby rub the surface of the amorphous silicon layer 23 and clean an adherent object such as a corona product.

The cleaning blade 73 is a cleaning member for finishing the peripheral surface of the photosensitive drum 20 and made of an elastic material such as rubber in the shape of a plate. The cleaning blade 73 inclines in such a way that its tip descends toward the amorphous silicon layer 23 corresponding to the peripheral surface of the photosensitive drum 20, lies above inside of the cleaning-unit body 71 and is slightly elastically deformed to bring a blade edge 731 at its tip into contact with the amorphous silicon layer 23. As the photosensitive drum 20 rotates clockwise, the cleaning blade 73 scratches the residual toner T1 not removed by the cleaning roller 72 off the amorphous silicon layer 23 reaching the blade edge 731 through the cleaning roller 72.

The residual toner T1 of the amorphous silicon layer 23 removed by the cleaning roller 72 and the cleaning blade 73 is introduced into the cleaning-unit body 71 and after temporarily stored there, it is collected into a collection bottle (not shown) provided in the apparatus body 11 (FIG. 1) by the drive of a specified transferring means.

The photosensitive drum 20, exposure unit 40, development unit 50 and cleaning unit 70 are each formed, for example, as a unit process cartridge attachable and removable for the apparatus body 11.

FIG. 3 is a block diagram showing an electrical configuration of the image forming apparatus 1 of FIG. 1. Each process cartridge forming the photosensitive drum 20, exposure unit 40, development unit 50 and cleaning unit 70 includes an EEPROM (or electrically erasable and programmable read only memory) respectively. Each EEPROM is an EEPROM provided, for example, with a serial communication interface in an I2C (or inter integrated circuit) method which has in storage various kinds of information on each process cartridge such as the manufacturing serial number or type of each process cartridge and the number of times of image formations by each process cartridge.

The external-communication I/F portion 111 is, for example, an interface circuit which is connected to an external apparatus such as a personal computer through the transmission line 110 such as a LAN (local area network) and a USB (universal serial bus) and that transmits and receives a communication signal to and from the external apparatus. The external-communication I/F portion 111 converts data from the control unit 100 into a communication signal receivable by the external apparatus and converts a communication signal from the external apparatus, for example, image data into data in a format which can be processed by the control unit 100. A paper forwarding portion 120 is a paper forwarding mechanism formed by the pickup roller 122, the fed-paper forwarding path 123, the resist roller pair 124, the discharged-paper forwarding path 143 and the like.

The control unit 100 is a control circuit which executes image formation by controlling the operation of the paper forwarding portion 120, the charging roller 30, the charging-roller power source 33, the exposure unit 40, the development unit 50, the development AC-power source 531, the development DC-power source 532, the transfer roller 60, the transfer DC-power source 632, the cleaning unit 70 and the fixing unit 14 on the basis of image data transmitted to the external-communication I/F portion 111 from the external apparatus such as a personal computer connected via the transmission line 110.

The control unit 100 includes, for example: a CPU (or central processing unit) which executes a predetermined arithmetic processing; anon-volatile ROM (or read only memory) which has a predetermined control program stored therein; a RAM (or random access memory) which stores data temporarily; peripheral circuits thereof; and the like. The control unit 100 executes, for example, the control program stored in the ROM to thereby control the operation of the paper forwarding portion 120, the charging roller 30, the charging-roller power source 33, the exposure unit 40, the development unit 50, the development AC-power source 531, the development DC-power source 532, the transfer roller 60, the transfer DC-power source 632, the cleaning unit 70 and the fixing unit 14.

In addition to this configuration, the control unit 100 executes, for example, the control program stored in the ROM to thereby function as an image-data acquisition portion 101, a bar-code detection portion 102, an image-formation condition setting portion 103, a table storage portion 104, an image-formation control portion 105, a guidance portion 106 and an evaluation portion 107.

The image-data acquisition portion 101 acquires image data read by the original reading portion 802 and image data from the external apparatus received by the external-communication I/F portion 111.

The bar-code detection portion 102 detects whether image data indicating a bar code is included or not in image data acquired by the image-data acquisition portion 101, specifically by detecting a command indicating the existence of a bar code existing in the image data. In this embodiment, a bar code made up of a white bar and a black bar is adopted, however the present invention is not limited to this and can be applied to a bar code made up of several differently-colored bars.

The image-formation condition setting portion 103 sets an image formation condition for giving a sheet of paper an image formation operation based upon image data acquired by the image-data acquisition portion 101.

Notice should be taken that in order to form a bar code more precisely, the image formation condition for giving a sheet of paper an image formation operation based upon image data on the bar code is separately preset from an image formation condition for giving a sheet of paper an image formation operation (ordinary image formation operation) based upon image data other than that of the bar code.

In this embodiment, as parameters determining the image formation condition, for example, in order to improve the evaluation given by the ANSI (or American National Standards Institute), an electric current (referred to as the transfer current) flowing out from the transfer roller 60 is set as the image formation condition (parameters determining the quality of an image) in accordance with the direct-current voltage Vdc1 (referred to as the development bias) outputted from the development DC-power source 532, the frequency of the alternating voltage Vac1 (referred to as the development frequency) outputted from the development AC-power source 531 and the direct-current voltage Vdc2 outputted from the transfer DC-power source 632.

Those parameters are set, for example, on the basis of bar-code printing standards provided by the ANSI. The ANSI stipulates evaluation items: toner dirt (toner placed on an unexpected part (white part)), a partly-whitened bar (omission), the optical reflectance of a bar (parameter inversely proportional to a toner density) and the like. Toner dirt varies according to the value of the development frequency or the transfer current, and thus, an occurrence of toner dirt can be suppressed by heightening the development frequency or increasing the transfer current. A partly-whitened bar is created when a toner is in short supply, and thus, an occurrence of a partly-whitened bar can be suppressed by heightening the development bias (direct-current voltage) or lowering the surface potential of the photosensitive drum 20. If a white bar has a low optical reflectance (a high toner density) and a fog (toner placed on a part corresponding to a white paper part) is produced, then the development bias is lowered or the surface potential of the photosensitive drum 20 is heightened to thereby reduce the quantity of a toner and raise the optical reflectance (drop the toner density). On the other hand, if a black bar has a high optical reflectance (a low toner density), then the development bias is heightened or the surface potential of the photosensitive drum 20 is lowered to thereby increase the quantity of a toner and lower the optical reflectance (raise the toner density).

Other than those evaluation items, for example, there is a contrast (the amount of a variation in image data on the boundary (shown by arrows D and E of FIG. 7B described later) between a black bar and a white bar). The contrast can be improved by increasing the transfer current and heightening the development frequency or by optimizing the combination of the development bias and the surface potential of the photosensitive drum 20.

Figures 4, 5:
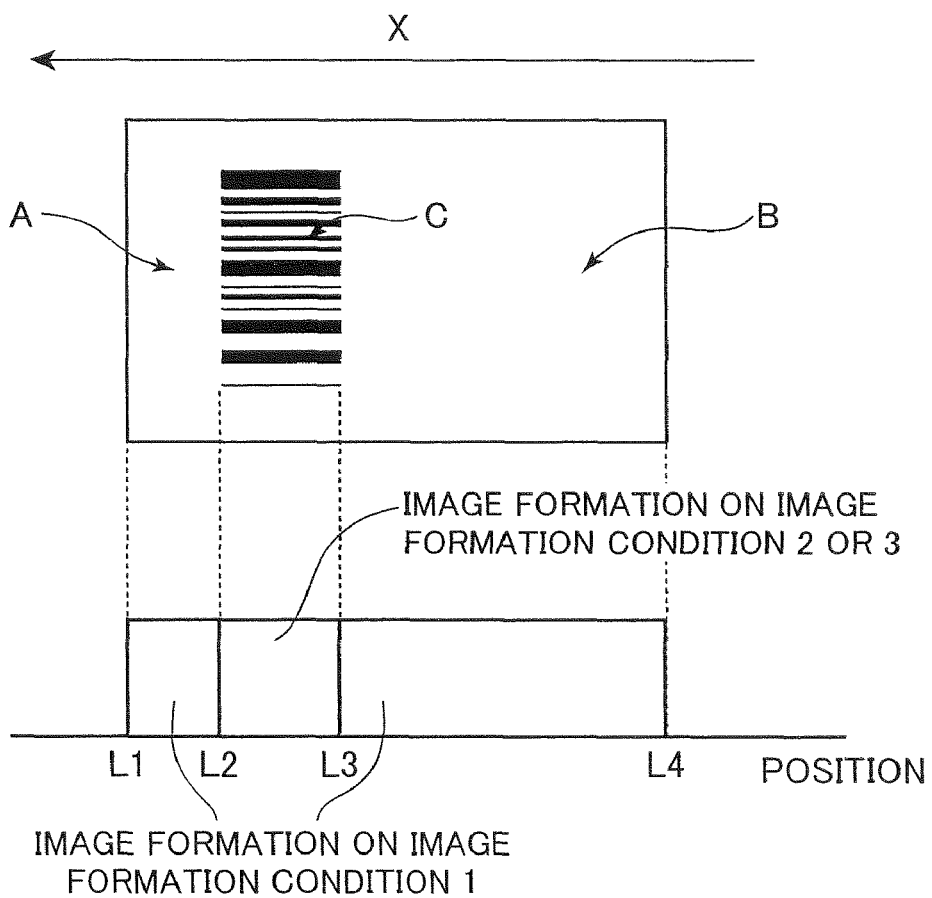
FIG. 4 is a table showing an image-formation condition table stored in a table storage portion.
FIG. 5 shows an image-formation condition setting processing.

The table storage portion 104 (image-formation condition storage portion) stores the image formation condition in advance in a table form. FIG. 4 shows an image-formation condition table stored in the table storage portion 104 which is created by setting as parameters thereof the development frequency and the surface potential of the photosensitive drum 20 among the parameters involved with the image formation condition.

The table of FIG. 4 has three image formation conditions: an image formation condition (referred to as the image formation condition 1) where the development frequency is $\alpha$ (kHz) and the surface potential of the photosensitive drum 20 is $\beta$ (V), an image formation condition (referred to as the image formation condition 2) where the development frequency is $(\alpha-3)$ (kHz) and the surface potential of the photosensitive drum 20 is $(\beta+10)$ (V), and an image formation condition (referred to as the image formation condition 3) where the development frequency is $(\alpha-6)$ (kHz) and the surface potential of the photosensitive drum 20 is $(\beta+20)$ (V).

However, the image formation conditions are not limited to the image formation conditions 1 to 3, and herein, the image formation condition 1 is considered to be suitable for an image formation operation executed based on ordinary image data except a bar code.

If the bar-code key 801 is pressed to thereby accept an instruction for an image-formation condition setting processing, the image-formation condition setting portion 103 shifts to a bar-code mode and starts executing the image-formation condition setting processing described later.

On the other hand, unless the bar-code key 801 is pressed to thereby accept an instruction for an image-formation condition setting processing, the image-formation condition setting portion 103 sets as the image formation condition the image formation condition 1 suitable for an ordinary image in an ordinary mode.

If the bar-code detection portion 102 judges that image data indicating a bar code is not included in image data acquired by the image-data acquisition portion 101 and thus is image data (e.g., on a text or a photograph) other than the bar code, then as the image-formation condition setting processing in the bar-code mode, the image-formation condition setting portion 103 reads, for example, the image formation condition 1 in the image-formation condition table stored in the table storage portion 104 and sets the image formation condition 1 as the image formation condition for an image formation operation based on the image data.

On the other hand, if the bar-code detection portion 102 judges that image data indicating a bar code is included in image data acquired by the image-data acquisition portion 101, the image-formation condition setting portion 103 divides the recording surface of the sheet of paper into a first area including the bar code and a second area other than the first area in the forwarding direction, sets the image formation condition 2 or 3 as an image formation condition for an image formation operation based upon first image data on an image to be formed in the first area and sets the image formation condition 1 as an image formation condition for an image formation operation based upon second image data on an image to be formed in the second area.

Specifically, as shown in FIG. 5, a sheet of paper as a recording medium is forwarded in the direction of an arrow X and an image is formed from a position L1 at one end toward a position L4 at the other end of the sheet of paper. In this case, the image-formation condition setting portion 103 sets the image formation condition 1 for image data on an image to be formed in the area (shown by an arrow A; the second area) from the position L1 to a position L2 on the sheet of paper, sets the image formation condition 2 or 3 for image data on an image to be formed in the area (shown by an arrow C; the first area) from the position L2 to a position L3, and sets the image formation condition 1 for image data on an image to be formed in the area (shown by an arrow B; the second area) from the position L3 to the position L4.

The image-formation control portion 105 allows the image formation portion 13 to execute an image formation operation on an image formation condition set by the image-formation condition setting portion 103. Specifically, if image data indicating a bar code is not included in image data acquired by the image-data acquisition portion 101, the image-formation control portion 105 allows the image formation portion 13 to execute an image formation operation on the image formation condition 1.

If image data indicating a bar code is included in image data acquired by the image-data acquisition portion 101, the image-formation control portion 105 allows the image formation portion 13 to execute the image formation operation shown in FIG. 5.

More specifically, as shown in FIG. 5, the image-formation control portion 105 allows the image formation portion 13 to execute an image formation operation on the image formation condition 1 in the area (shown by the arrow A) from the position L1 to the position L2 on a sheet of paper forwarded in the arrow-X direction. Thereafter, it switches the image formation condition for an image formation operation executed by the image formation portion 13 from the image formation condition 1 to the image formation condition 2 or 3 and allows the image formation portion 13 to execute an image formation operation on the image formation condition 2 or 3 in the area (shown by the arrow C) from the position L2 to the position L3. Lastly, it switches the image formation condition for an image formation operation executed by the image formation portion 13 again from the image formation condition 2 or 3 to the image formation condition 1 and allows the image formation portion 13 to execute an image formation operation on the image formation condition 1 in the area (shown by the arrow B) from the position L3 to the position L4.

If an image formation operation based on an instruction by the image-formation control portion 105 is executed for a sheet of paper when image data indicating a bar code is included in image data acquired by the image-data acquisition portion 101, then as shown in FIG. 6, the guidance portion 106 displays a guidance picture leading a user into allowing the original reading portion 802 to read an image on the sheet of paper.

The evaluation portion 107 evaluates the image quality of bar-code image data obtained in a reading operation executed by the original reading portion 802 after the guidance picture is displayed. FIG. 7A is an enlarged view of some bars in the bar code obtained in the reading operation executed by the original reading portion 802 after the guidance picture is displayed.

After the guidance picture is displayed, the original reading portion 802 executes the reading operation to thereby obtain, for example, an image-data graph shown in FIG. 7B, for example, from the bar code of FIG. 7A. On the basis of the graph of FIG. 7B, the evaluation portion 107 evaluates (e.g., grades) the image quality of image data on the bar code of FIG. 7A.

The evaluation portion 107 evaluates such image data on a bar code in terms of the above described items: toner dirt, a partly-whitened bar, the optical reflectance of a black bar (black belt part) and the contrast between a black bar and a white bar (white belt part). It estimates a bar-code image to have a specified image quality if an evaluation value indicating each parameter (toner dirt, partly-whitened black bar, optical reflectance and contrast) exceeds a predetermined threshold value: if the amount of toner dirt is smaller than a specified value, the white part of a partly-whitened black bar is smaller than a specified value, the optical reflectance of a black bar is within a proper range and the amount of a variation in image data on the boundary between a black bar and a white bar is greater than a specified value. If not, the evaluation portion 107 estimates a bar-code image to have not a specified image quality.

Specifically, the evaluation portion 107 counts as a toner-dirt number, for example, the number of black-dot image patterns existing in a white belt part of a bar-code image and sets an evaluation value indicating toner dirt in such a way that the greater the counted number becomes, the smaller the evaluation value becomes. Furthermore, the evaluation portion 107 counts as the number of white parts (omissions) of a black bar, for example, the number of white-dot image patterns existing in a black bar of a bar-code image and sets an evaluation value indicating a partly-whitened bar in such a way that the greater the counted number becomes, the smaller the evaluation value becomes.

Moreover, the evaluation portion 107 sets an evaluation value indicating an optical reflectance or a contrast, for example, in such a way that the evaluation value becomes larger as the optical reflectance of a black bar in a bar-code image or a contrast value indicating the density difference (amount of a variation) in image data on the boundary between a black bar and a white bar comes closer to the middle value of a predetermined proper range while the evaluation value becomes smaller as the optical reflectance or the contrast value goes farther away from the middle value of the proper range.

In accordance with whether or not those evaluation values have exceeded the predetermined threshold values, the evaluation portion 107 decides whether the bar-code image has the above specified image quality.

If the evaluation portion 107 estimates the image of a bar code not to have a specified image quality, the image-formation condition setting portion 103 changes the image formation condition for an image formation operation based upon image data in the bar-code area. If the image-formation condition setting portion 103 changes the image formation condition, the image-formation control portion 105 allows the image formation portion 13 to execute an image formation operation on the changed image formation condition. Then, the guidance portion 106 displays a guidance picture leading a user into allowing the original reading portion 802 to read an image on a sheet of paper obtained in the image formation operation, and the evaluation portion 107 again evaluates the image quality of bar-code image data obtained in a reading operation executed by the original reading portion 802 after the guidance picture is displayed.

The image-formation condition setting portion 103, image-formation control portion 105, guidance portion 106 and evaluation portion 107 repeat the above processing until the evaluation portion 107 estimates the bar-code image to have the specified image quality, thereby setting the image formation condition most suitable for forming an image of the bar code from among a plurality of image formation conditions stored in the table storage portion 104.

Figure 9:
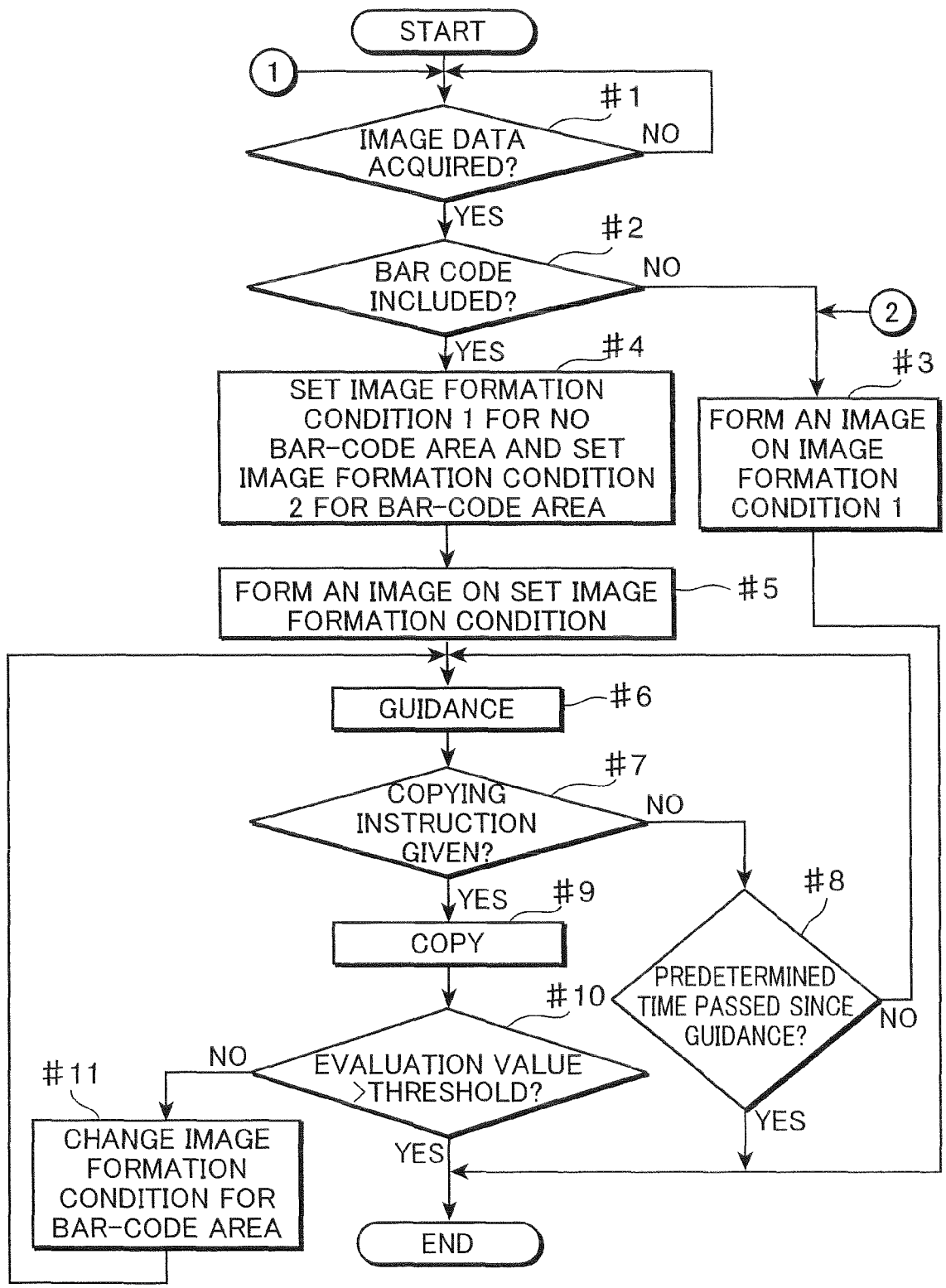
FIG. 9 is a flow chart showing an image-formation condition setting processing for a bar code by a control unit.

FIG. 8 is a flow chart showing an operation of the image forming apparatus 1 of FIG. 1 and FIG. 9 is a flow chart showing an image-formation condition setting processing for a bar code by the control unit 100. The image formation condition is initially preset to the image formation condition 1.

First, if the bar-code key 801 is pressed (YES at a step #101), in other words, it accepts an instruction to execute an image-formation condition setting processing, and further, if the start key 805 is pressed (YES at a step #102), then the image-formation condition setting portion 103 shifts to a bar-code mode and prompts the original reading portion 802 to read an original image (in a step #103), and moves ahead to a step #1 to start executing the image-formation condition setting processing.

On the other hand, if the bar-code key 801 is not pressed (NO at the step #101), in other words, it does not accept an instruction to execute an image-formation condition setting processing, and if the start key 805 is pressed (YES at a step #104), then in an ordinary mode, the image-formation condition setting portion 103 prompts the original reading portion 802 to read an original image (in a step #105) and shifts to a step #3 to form an image on the image formation condition 1 suitable for an ordinary image.

Next, if the control unit 100 (the image-data acquisition portion 101) acquires image data read by the original reading portion 802 in the image-formation condition setting processing shown in FIG. 9 (YES at the step #1), the bar-code detection portion 102 judges whether image data indicating a bar code is included or not in the image data (in a step #2). If it is not included (NO at the step #2), the image-formation condition setting portion 103 sets the image formation condition 1 and the image-formation control portion 105 allows the image formation portion 13 to execute an image formation operation on the image formation condition 1 (in the step #3).

On the other hand, in the step #2, if image data indicating a bar code is included in the image data acquired by the image-data acquisition portion 101 (YES at the step #2), then as shown in FIG. 5, the image-formation condition setting portion 103: divides the recording surface of the sheet of paper into the first area (shown by the arrow C of FIG. 5) including the bar code and the second area (shown by the arrows A and B of FIG. 5) other than the first area in the forwarding direction; sets, for example, the image formation condition 2 as an image formation condition for an image formation operation based upon first image data on an image to be formed in the first area; and sets the image formation condition 1 as an image formation condition for an image formation operation based upon second image data on an image to be formed in the second area (in a step #4). Then, the image-formation control portion 105 allows the image formation portion 13 to execute an image formation operation on the image formation condition set in the step #4 (in a step #5).

Next, the control unit 100 (the guidance portion 106) displays, for example, the guidance picture of FIG. 6 to thereby lead a user into allowing the original reading portion 802 to read an image on the sheet of paper formed in the image formation operation of the step #5 (in a step #6). Thereafter, the control unit 100 (the guidance portion 106) judges whether the user has inputted a copying instruction, for example, by pressing the bar-code key 801 (in a step #7). If it judges the user has not inputted the copying instruction (NO at the step #7), the control unit 100 judges whether or not a predetermined time has elapsed since the guidance began (in a step #8).

If judging that the predetermined time has elapsed since the guidance began (YES at the step #8), the control unit 100 (the guidance portion 106) ends the processing, while if judging that the predetermined time has not elapsed since the guidance began (NO at the step #8), it returns to the processing of the step #6.

If the control unit 100 (the image-formation control portion 105) judges that the user has inputted the copying instruction before the predetermined time elapses (YES at the step #7), it allows the original reading portion 802 and the image formation portion 13 to execute a copying operation on an image formation condition set earlier (in a step #9).

Sequentially, the control unit 100 (the evaluation portion 107) evaluates the image quality of image data obtained in the copying operation of the step #9 and judges whether or not the evaluation value is more than the threshold value (in a step #10). If judging that the evaluation value is less than the threshold value (NO at the step #10), the control unit 100 (the evaluation portion 107) changes the image formation condition for the bar-code area (in a step #11), returns to the processing of the step #6 and executes the steps #6 to #10 again. On the other hand, if the control unit 100 (the evaluation portion 107) judges that the evaluation value is more than the threshold value (YES at the step #10) it ends the processing.

Alternatively, it may be appreciated that in the step #10, the evaluation portion 107 compares each evaluation value indicating, for example, toner dirt, a partly-whitened bar, an optical reflectance and a contrast with a threshold value provided for each evaluation item and ends the processing if all the evaluation values are more than the corresponding threshold values (YES at the step #10) or if the total of the evaluation values are more than a predetermined threshold value (YES at the step #10).

As described so far, an image formation condition for executing an image formation operation based upon image data on a bar code is separately set from an image formation condition for giving a sheet of paper an image formation operation (ordinary image formation operation) based upon image data other than the bar code. If image data indicating a bar code is included in acquired image data, then the recording surface of the sheet of paper is divided into a first area including the bar code and a second area other than the first area in the forwarding direction, and an image formation condition for an image formation operation based upon first image data on an image to be formed in the first area is set, for example, to the image formation condition 2 and an image formation condition for an image formation operation based upon second image data on an image to be formed in the second area is set to the image formation condition 1. This makes it possible to execute an image formation operation suitable for forming a bar-code image. Besides, even in an image formation operation based upon image data other than a bar code, an image formation operation more suitable for forming an image in the area except the bar code can be executed than adopting an image formation condition for an image formation operation based upon image data on the bar code. As a result, an image can be formed on an image formation condition suitable for each of a bar-code image and the other image, thereby forming a fare image.

Instead of the above embodiment or in addition thereto, the present invention can also be adopted as the following variations.

[1] The processing of the steps #6 to #11 in the flow chart of FIG. 9 has to be not necessarily executed, and thus, the present invention also includes executing only once an image-formation condition setting processing for setting an image formation condition suitable for forming a bar-code image and an image formation condition suitable for forming an image excluding the bar code, thereby offering an advantage in that a bar-code image or the other image can be more precisely formed. However, executing the processing of the steps #6 to #11 is useful for improving the image formation precision of a bar code or the like more than executing the image-formation condition setting processing only once.

[2] In the above embodiment, a sheet of paper is employed as a recording medium, however the recording medium is not limited to this and thus includes, for example, a surface of an electronic device such as a substrate, cloth, a can or the like.

[3] The image-formation condition setting portion has to not necessarily divide one page of a sheet of paper into a first area and a second area except the first area. Alternatively, it may be appreciated that it decides whether a bar code is included for each page in image data, sets the first image formation condition as an image formation condition for each page not including a bar code and sets the second image formation condition as an image formation condition for each page including a bar code.

In sum, an image forming apparatus according to an aspect of the present invention includes: an image formation portion forming an image onto a recording surface of a recording medium forwarded in a predetermined forwarding direction in an electro-photographic process of transferring a toner image obtained by developing an electrostatic latent image indicating an image with toner to thereby form an image; an image-data acquisition portion acquiring image data; an image-formation condition storage portion storing in advance first and second image formation conditions which are conditions for the electro-photographic process and different from each other; an image-formation condition setting portion which executes an image-formation condition setting processing for, if data indicating a bar code is not included in image data acquired by the image-data acquisition portion, then setting the first image formation condition as an image formation condition for an image formation operation based on the image data, and if image data indicating a bar code is included in image data acquired by the image-data acquisition portion, then setting the second image formation condition as an image formation condition for an image formation operation based on the image data; and an image-formation control portion allows the image formation portion to execute an image formation operation based on image data acquired by the image-data acquisition portion according to the image formation condition set by the image-formation condition setting portion.

According to this configuration, if data indicating a bar code is not included in image data acquired by the image-data acquisition portion, in other words, if an ordinary image including no bar code is formed, then the image-formation condition setting portion sets the first image formation condition for the electro-photographic process suitable for forming the ordinary image as an image formation condition for an image formation operation based on the image data. Therefore, the image formation portion can form an image based on the image data acquired by the image-data acquisition portion in accordance with the image formation condition suitable for forming the ordinary image, thereby suppressing a deterioration in the quality of the ordinary image except the bar code.

On the other hand, if data indicating a bar code is included in image data acquired by the image-data acquisition portion, in other words, if an image of the bar code is formed, then the image-formation condition setting portion sets the second image formation condition for the electro-photographic process suitable for forming the image of the bar code different from the first image formation condition as an image formation condition for an image formation operation based on the image data. Therefore, the image formation portion can form an image based on the image data acquired by the image-data acquisition portion in accordance with the image formation condition suitable for forming the image of the bar code, thereby improving the image quality of the bar code. In this case, the condition for the electro-photographic process becomes suitable for forming the bar-code image, thereby enhancing the bar-code image quality in other factors than the bar thickness as well. This makes it possible to improve the bar-code image quality while suppressing a deterioration in the quality of an ordinary image other than the bar code.

Furthermore, it is preferable that if image data indicating a bar code is included in image data acquired by the image-data acquisition portion, then the image-formation condition setting portion divides the recording surface into a first area including the bar code and a second area other than the first area in the forwarding direction, sets the second image formation condition as an image formation condition for an image formation operation based upon first image data on an image to be formed in the first area and sets the first image formation condition as an image formation condition for an image formation operation based upon second image data on an image to be formed in the second area.

When an image is formed on an image formation condition for improving the image quality of a bar code such as making the bar thickness or density of a bar code appropriate, whitening a white line purely, preventing a bar from being partially omitted, if image data on a bar code and image data other than the bar code are mixed together in image data, then an image formation condition for the part except the bar code does not match with a condition suitable for forming a bar-code image, thereby possibly deteriorating the image quality of the part except the bar code.

According to the above configuration, therefore, if image data indicating a bar code is included in image data acquired by the image-data acquisition portion, then the recording surface is divided into a first area including the bar code and a second area other than the first area in the forwarding direction, and an image formation condition (the second image formation condition) different from an image formation condition (the first image formation condition) in the case where image data indicating a bar code is not included in image data acquired by the image-data acquisition portion is set as an image formation condition for an image formation operation based upon first image data on an image to be formed in the first area. This makes it possible to form an image of the part including the bar code on an image formation condition suitable for forming a bar-code image and form an image of the part not including the bar code on an image formation condition suitable for forming an ordinary image.

Besides, if image data indicating a bar code is included in image data acquired by the image-data acquisition portion, the first image formation condition is set as an image formation condition for an image formation operation based upon second image data on an image to be formed in the second area. Therefore, for example, if the recording medium is a sheet of paper, then on the single sheet of paper, an image formation operation can be executed on an image formation condition suitable for an image except the bar code.

Consequently, even if a bar-code image and an image except the bar-code image are mixed together, a high-quality image can be formed for the bar-code image without deteriorating the quality of an image for the image except the bar-code image.

Moreover, the image formation portion may include a development roller which is given an alternating voltage and supplies a photosensitive drum with toner to thereby reveal an electrostatic latent image formed on the surface of the photosensitive drum; the frequency of an alternating voltage applied to the development roller may be used as a parameter for determining an image formation condition for an image formation operation based on image data acquired by the image-data acquisition portion; and the second image formation condition may be set in such a way that the frequency of an alternating voltage applied to the development roller becomes a value different from the first image formation condition.

In addition, the image formation portion may include a photosensitive drum forming an electrostatic latent image on the surface thereof; a surface potential of the photosensitive drum may be used as another parameter for determining the image formation condition; and the second image formation condition may be set in such a way that the surface potential of the photosensitive drum becomes a value different from the first image formation condition.

Furthermore, the image formation portion may include a development roller which is given a direct-current voltage and supplies a photosensitive drum with toner to thereby reveal an electrostatic latent image formed on the surface of the photosensitive drum; a direct-current voltage applied to the development roller may be used as another parameter for determining the image formation condition; and the second image formation condition may be set in such a way that the direct-current voltage applied to the development roller becomes a value different from the first image formation condition.

Moreover, the image formation portion may include a photosensitive drum for revealing an electrostatic latent image formed on the surface thereof with toner, and a transfer roller which transfers a toner creating a revealed image formed on the surface of the photosensitive drum onto the recording medium by giving the recording medium a polarity reverse to the polarity of the toner when the transfer roller and the photosensitive drum hold the recording medium between; a transfer current supplied to the transfer roller may be used as another parameter for determining the image formation condition; and the second image formation condition may be set in such a way that a transfer current supplied to the transfer roller becomes a value different from the first image formation condition.

In addition, it is preferable that: the recording medium is a sheet body; the image forming apparatus includes an original reading portion reading an original image, a guidance portion which leads a sheet body having an image formed according to an instruction given by the image-formation control portion into receiving a reading operation of the original reading portion, and an evaluation portion evaluating the image quality of image data obtained in the reading operation of the original reading portion after the guidance of the guidance portion; and if the evaluation portion does not give a specified evaluation, the image-formation condition setting portion changes the second image formation condition in such a way that the evaluation of the evaluation portion improves.

According to this configuration, if the evaluation portion does not give a specified evaluation, the second image formation condition is changed in such a way that the evaluation of the evaluation portion improves, thereby setting the image formation condition most suitable for forming a bar-code image from among a plurality of image formation conditions held in the image forming apparatus.

Furthermore, it is preferable that: the image formation portion includes a development roller which is given an alternating voltage and supplies a photosensitive drum with toner to thereby reveal an electrostatic latent image formed on the surface of the photosensitive drum; the first and second image formation conditions are set in such a way that the frequency of the alternating voltage becomes a value different from each other; the evaluation portion evaluates toner dirt; and if the evaluation portion does not give a specified evaluation because there is more toner dirt than a predetermined amount, the image-formation condition setting portion changes the second image formation condition in such a way that the frequency of the alternating voltage heightens.

As the frequency of the alternating voltage for moving a toner from development roller to the photosensitive drum heightens, toner dirt decreases. Therefore, when there is more toner dirt than a predetermined amount, the frequency of the alternating voltage for moving the toner from development roller to the photosensitive drum is heightened to reduce toner dirt, thereby improving the evaluation of the evaluation portion.

Moreover, it is preferable that: the image formation portion includes a development roller which is given an alternating voltage and supplies a photosensitive drum with toner to thereby reveal an electrostatic latent image formed on the surface of the photosensitive drum; the first and second image formation conditions are set in such a way that the frequency of the alternating voltage becomes a value different from each other; the evaluation portion evaluates a contrast indicating the amount of a variation in image data on the boundary between two adjacent differently-colored bars; and if the specified evaluation is not given because the contrast is smaller than a predetermined amount, the image-formation condition setting portion changes the frequency of the alternating voltage in the second image formation condition.

There is a correlation between the frequency of the alternating voltage for moving a toner to the photosensitive drum to reveal an image and the contrast of an image. Therefore, if the contrast is smaller than a predetermined amount, the frequency of the alternating voltage change is changed to enhance the contrast, thereby improving the evaluation of the evaluation portion.

In addition, it is preferable that: the image formation portion includes a photosensitive drum forming an electrostatic latent image on the surface thereof; the first and second image formation conditions are set in such a way that the surface potential of the photosensitive drum becomes a value different from each other; the evaluation portion evaluates the omission state of a bar; and if the specified evaluation is not given because an omission of the bar is larger than a predetermined amount, the image-formation condition setting portion changes the second image formation condition in such a way that the surface potential of the photosensitive drum falls.

As the surface potential of the photosensitive drum falls, the quantity of a toner for developing an electrostatic latent image increases. Therefore, when the omission of a high-density bar (e.g., a black bar) is larger than a predetermined amount, the surface potential of the photosensitive drum is dropped to raise the toner density and restrain the bar from being partially omitted, thereby improving the evaluation of the evaluation portion.

Furthermore, it is preferable that: the image formation portion includes a photosensitive drum forming an electrostatic latent image on the surface thereof; the first and second image formation conditions are set in such a way that the surface potential of the photosensitive drum becomes a value different from each other; the evaluation portion evaluates the optical reflectance of each bar constituting the bar code; and if the specified evaluation is not given because the optical reflectance is lower than a predetermined value, the image-formation condition setting portion changes the second image formation condition in such a way that the surface potential of the photosensitive drum rises.

As the surface potential of the photosensitive drum rises, the quantity of a toner for developing an electrostatic latent image decreases. Therefore, when the optical reflectance of a low-density bar (e.g., a white bar) is lower (the density is higher) than a predetermined value, the surface potential of the photosensitive drum is raised to lower the toner density and heighten the optical reflectance of the bar, thereby improving the evaluation of the evaluation portion.

Moreover, it is preferable that: the image formation portion includes a photosensitive drum forming an electrostatic latent image on the surface thereof; the first and second image formation conditions are set in such a way that the surface potential of the photosensitive drum becomes a value different from each other; the evaluation portion evaluates a contrast indicating the amount of a variation in image data on the boundary between two adjacent differently-colored bars; and if the specified evaluation is not given because the contrast is smaller than a predetermined amount, the image-formation condition setting portion changes the surface potential of the photosensitive drum.

There is a correlation between the surface potential of the photosensitive drum and the contrast of an image. Therefore, if the contrast is smaller (lower) than a predetermined amount, the surface potential of the photosensitive drum is changed to enhance the contrast, thereby improving the evaluation of the evaluation portion.

In addition, it is preferable that: the image formation portion includes a development roller which is given a direct-current voltage and supplies a photosensitive drum with toner to thereby reveal an electrostatic latent image formed on the surface of the photosensitive drum; the first and second image formation conditions are set in such a way that the direct-current voltage becomes a value different from each other; the evaluation portion evaluates the omission state of a bar; and if the specified evaluation is not given because an omission of the bar is larger than a predetermined amount, the image-formation condition setting portion changes the second image formation condition in such a way that the direct-current voltage heightens.

As the direct-current voltage supplied to the development roller rises, the quantity of a toner for developing an electrostatic latent image increases. Therefore, when the omission of a high-density bar (e.g., a black bar) is larger than a predetermined amount, the direct-current voltage supplied to the development roller is raised to raise the toner density and restrain the bar from being partially omitted, thereby improving the evaluation of the evaluation portion.

Furthermore, it is preferable that: the image formation portion includes a development roller which is given a direct-current voltage and supplies a photosensitive drum with toner to thereby reveal an electrostatic latent image formed on the surface of the photosensitive drum; the first and second image formation conditions are set in such a way that the direct-current voltage becomes a value different from each other; the evaluation portion evaluates the optical reflectance of each bar constituting the bar code; and if the specified evaluation is not given because the optical reflectance is lower than a predetermined value, the image-formation condition setting portion changes the second image formation condition in such a way that the direct-current voltage lowers.

As the direct-current voltage supplied to the development roller lowers, the quantity of a toner for developing an electrostatic latent image decreases. Therefore, when the optical reflectance of a low-density bar (e.g., a white bar) is lower (the density is higher) than a predetermined value, the direct-current voltage is lowered to lower the toner density and heighten the optical reflectance of the bar, thereby improving the evaluation of the evaluation portion.

Moreover, it is preferable that: the image formation portion includes a development roller which is given a direct-current voltage and supplies a photosensitive drum with toner to thereby reveal an electrostatic latent image formed on the surface of the photosensitive drum; the first and second image formation conditions are set in such a way that the direct-current voltage becomes a value different from each other; the evaluation portion evaluates a contrast indicating the amount of a variation in image data on the boundary between two adjacent differently-colored bars; and if the specified evaluation is not given because the contrast is smaller than a predetermined amount, the image-formation condition setting portion changes the direct-current voltage in the second image formation condition.

There is a correlation between the direct-current voltage supplied to the development roller and the contrast of an image. Therefore, if the contrast is smaller than a predetermined amount, the direct-current voltage supplied to the development roller is changed to enhance the contrast, thereby improving the evaluation of the evaluation portion.

In addition, it is preferable that: the image formation portion includes a photosensitive drum for revealing an electrostatic latent image formed on the surface thereof with toner, and a transfer roller which transfers a toner creating a revealed image formed on the surface of the photosensitive drum onto the recording medium by giving the recording medium a polarity reverse to the polarity of the toner to thereby generate a transfer current when the transfer roller and the photosensitive drum hold the recording medium between; the first and second image formation conditions are set in such a way that the transfer current becomes a value different from each other; the evaluation portion evaluates toner dirt; and if the specified evaluation is not given because there is more toner dirt than a predetermined amount, the image-formation condition setting portion increases the transfer current in the second image formation condition.

As the transfer current increases, toner dirt decreases. Therefore, when there is more toner dirt than a predetermined amount, the transfer current is increased to reduce toner dirt, thereby improving the evaluation of the evaluation portion.

Furthermore, it is preferable that: the image formation portion includes a photosensitive drum for revealing an electrostatic latent image formed on the surface thereof with toner, and a transfer roller which transfers a toner creating a revealed image formed on the surface of the photosensitive drum onto the recording medium by giving the recording medium a polarity reverse to the polarity of the toner to thereby generate a transfer current when the transfer roller and the photosensitive drum hold the recording medium between; the first and second image formation conditions are set in such a way that the transfer current becomes a value different from each other; the evaluation portion evaluates a contrast indicating the amount of a variation in image data on the boundary between two adjacent differently-colored bars; and if the specified evaluation is not given because the contrast is smaller than a predetermined amount, the image-formation condition setting portion changes the second image formation condition in such a way that the transfer current increases.

As the transfer current increases, the contrast of an image becomes larger (higher). Therefore, if the contrast is smaller than a predetermined amount, the transfer current is increased to enhance the contrast, thereby improving the evaluation of the evaluation portion.

Moreover, preferably, the image-data acquisition portion may acquire image data equivalent to a plurality of pages, and the image-formation condition setting portion may execute the image-formation condition setting processing for each page in the image data.

According to this configuration, an image for a page not including a bar code is formed on the first image formation condition suitable for forming an ordinary image while an image for a page including a bar code is formed on the second image formation condition suitable for forming a bar-code image. This makes it possible to improve the image quality of a bar code without deteriorating the image quality of a page not including a bar code.

In addition, it is preferable that: the image forming apparatus further includes an instruction acceptance portion accepting an executive instruction for the image-formation condition setting processing, in which if the instruction acceptance portion accepts the executive instruction, the image-formation condition setting portion executes the image-formation condition setting processing, while if the instruction acceptance portion does not accept the executive instruction, then no matter whether data indicating a bar code is included or not in image data acquired by the image-data acquisition portion, the image-formation condition setting portion sets the first image formation condition as an image formation condition for an image formation operation based on the image data.

According to this configuration, when a user wants to improve the image quality of a bar code, the user gives an executive instruction for the image-formation condition setting processing using the instruction acceptance portion to thereby form an image on the second image formation condition suitable for the bar code, so that the quality of the bar-code image formed on a recording medium can be improved. On the other hand, when the user wants to prioritize the image quality of an ordinary image over a bar code, if the user does not give an executive instruction for the image-formation condition setting processing using the instruction acceptance portion, then no matter whether a bar code is included in image data, an image is formed on the first image formation condition suitable for the ordinary image, thereby preventing a deterioration in the quality of the ordinary image formed on a recording medium.

This application is based on Japanese patent application serial No. 2008-7994, filed in Japan Patent Office on Jan. 17, 2008, and No. 2008-316556, filed in Japan Patent Office on Dec. 12, 2008, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
   an image-data acquisition portion for acquiring image data;
   an image formation portion for forming an image onto a sheet forwarded in a predetermined forwarding direction based on image data acquired by the image-data acquisition portion, the image formation portion including:
   a photosensitive drum that forms and electrostatic latent image on a surface thereof;
   a development roller that is given a voltage and supplies the photosensitive drum with toner to thereby reveal an electrostatic latent image formed on the surface of the photosensitive drum; and
   a transfer portion that transfers a toner creating a revealed image formed on the surface of the photosensitive drum onto the sheet by giving the sheet a polarity reversed from the polarity of the toner;
   a control portion for controlling the image formation portion;
   an image-formation condition storage portion for storing in advance:
   a first image formation condition that is a suitable value for forming an ordinary toner image having no bar code on the sheet, the first image formation condition concerning at least one of a frequency of an alternating voltage applied to the development roller, a surface potential of the photosensitive drum, a direct-current voltage applied to the development roller and a transfer current supplied to the transfer portion, and a second image formation condition that is a suitable value for forming a toner image having a bar code on the sheet, the second image formation condition concerning at least one of a frequency of an alternating voltage applied to the development roller, a surface potential of the photosensitive drum, a direct-current voltage applied to the development roller and a transfer current supplied to the transfer portion, the second image formation conditions being different from the first image formation condition;

wherein the control portion allows the image formation portion to form a toner image onto the sheet based on image data acquired by the image-data acquisition portion:

at the first image formation condition when the image data includes no sub-image data indicating a bar code, and at the second image formation condition when the image data includes sub-image data indicating a bar code.

2. The image forming apparatus according to claim 1, wherein if sub-image data indicating a bar code is included in the image data acquired by the image-data acquisition portion, the control portion divides the sheet into a first area for the bar code image and a second area other than the first area in the forwarding direction, and allows the image formation portion to form an image based upon the sub-image data in the first area at the second image formation condition and allows the image formation portion to form an image based upon the image data excluding the sub-image data in the second area at the first image formation condition.

3. The image forming apparatus according to claim 1, wherein:
the first and second image formation conditions have different values from each other with respect to the frequency of an alternating voltage applied to the development roller.

4. The image forming apparatus according to claim 1, wherein:
the first and second image formation conditions have different values from each other with respect to the surface potential of the photosensitive drum.

5. The image forming apparatus according to claim 1, wherein:
the first and second image formation conditions have different values from each other with respect to the direct-current voltage applied to the development roller.

6. The image forming apparatus according to claim 1, wherein:
the first and second image formation conditions have different values from each other with respect to a transfer current supplied to the transfer portion.

7. The image forming apparatus according to claim 1, further comprising:
an original reading portion for reading an original image;
a guidance portion that feeds a sheet formed with an image formed according to an instruction of the control portion to the original reading portion, and
an evaluation portion for evaluating the image quality of image data obtained by reading the fed sheet by the original reading portion;
wherein if an evaluation of the evaluation portion is below a specified value, the control portion changes the second image formation condition in such a way that the evaluation of the evaluation portion rises.

8. The image forming apparatus according to claim 7, wherein:
the first and second image formation conditions have different values from each with respect to the frequency of the alternating voltage;
the evaluation portion evaluates toner dirt; and
if an evaluation of the evaluation portion is below a specified value because there is more toner dirt than a predetermined amount, the control portion changes the second image formation condition in such a way that the frequency of the alternating voltage rises.

9. The image forming apparatus according to claim 7, wherein:
the first and second image formation conditions have different values from each other with respect to the frequency of the alternating voltage;
the evaluation portion evaluates a contrast indicating the amount of a variation in image data on the boundary between two adjacent differently-colored bars; and
if an evaluation of the evaluation portion is below a specified value because the contrast is smaller than a predetermined amount, the control portion changes the second image formation condition concerning the frequency of the alternating voltage.

10. The image forming apparatus according to claim 7, wherein:
the first and second image formation conditions have different values from each other with respect to the surface potential of the photosensitive drum;
the evaluation portion evaluates an omission state of a bar; and
if an evaluation of the evaluation portion is below a specified value because an omission of the bar is larger than a predetermined amount, the control portion changes the second image formation condition in such a way that the surface potential of the photosensitive drum falls.

11. The image forming apparatus according to claim 7, wherein:
the first and second image formation conditions have different values from each other with respect to the surface potential of the photosensitive drum;
the evaluation portion evaluates an optical reflectance of each bar constituting the bar code; and
if an evaluation of the evaluation portion is below a specified value because the optical reflectance is lower than a predetermined value, the control portion changes the second image formation condition in such a way that the surface potential of the photosensitive drum rises.

12. The image forming apparatus according to claim 7, wherein:
the first and second image formation conditions have different values from each other with respect to the surface potential of the photosensitive drum;
the evaluation portion evaluates a contrast indicating the amount of a variation in image data on the boundary between two adjacent differently-colored bars; and
if an evaluation of the evaluation portion is below a specified value because the contrast is smaller than a predetermined amount, the control portion changes the surface potential of the photosensitive drum.

13. The image forming apparatus according to claim 7, wherein:
the first and second image formation conditions have different values from each other with respect to the direct-current voltage;
the evaluation portion evaluates an omission state of a bar; and
if an evaluation of the evaluation portion is below a specified value because an omission of the bar is larger than a predetermined amount, the control portion changes the second image formation condition in such a way that the direct-current voltage rises.

14. The image forming apparatus according to claim 7, wherein:
- the first and second image formation conditions have different values from each other with respect to the direct-current voltage;
- the evaluation portion evaluates an optical reflectance of each bar constituting the bar code; and
- if an evaluation of the evaluation portion is below a specified value because the optical reflectance is lower than a predetermined value, the control portion changes the second image formation condition in such a way that the direct-current voltage lowers.

15. The image forming apparatus according to claim 7, wherein:
- the first and second image formation conditions have different values from each other with respect to the direct-current voltage;
- the evaluation portion evaluates a contrast indicating the amount of a variation in image data on the boundary between two adjacent differently-colored bars; and
- if an evaluation of the evaluation portion is below a specified value because the contrast is smaller than a predetermined amount, the control portion changes the second image formation condition concerning the direct-current voltage.

16. The image forming apparatus according to claim 7, wherein:
- the first and second image formation conditions have different values from each other with respect to the transfer current;
- the evaluation portion evaluates toner dirt; and
- if an evaluation of the evaluation portion is below a specified value because there is more toner dirt than a predetermined amount, the control portion changes the second image formation condition in such a way that the transfer current increases.

17. The image forming apparatus according to claim 7, wherein:
- the first and second image formation conditions have different values from each other with respect to the transfer current;
- the evaluation portion evaluates a contrast indicating the amount of a variation in image data on the boundary between two adjacent differently-colored bars; and
- if an evaluation of the evaluation portion is below a specified value because the contrast is smaller than a predetermined amount, the control portion changes the second image formation condition in such a way that the transfer current increases.

18. The image forming apparatus according to claim 1, wherein:
- the image-data acquisition portion acquires image data of a plurality of pages; and
- the control portion allows the image formation portion to executes the image-formation of the image data for each page at the first or second image formation condition that is in accordance with a non-presence or presence of bar code image in the image data of each page.

19. The image forming apparatus according to claim 1, further comprising an instruction acceptance portion for accepting an executive instruction for image formation according to the image-formation condition,
- wherein if the instruction acceptance portion accepts the executive instruction, the control portion allows the image formation portion to execute image formation according to the image-formation condition, and if the instruction acceptance portion does not accept the executive instruction, the control portion allows the image formation portion to execute image formation at the first image formation condition.

* * * * *